United States Patent
Gerlach et al.

[11] 3,988,310
[45] Oct. 26, 1976

[54] REACTIVE DYESTUFFS CONTAINING A SUBSTITUTED 1-METHYL OR 1-ETHYL PYRAZOLYL RADICAL

[75] Inventors: Klaus Gerlach, Cologne-Flittard; Horst Jager; Georg Dehmel, both of Cologne-Buccheim, all of Germany

[73] Assignee: Bayer Aktiengesellschaft, Leverkusen, Germany

[22] Filed: Aug. 15, 1969

[21] Appl. No.: 850,634

[30] Foreign Application Priority Data
Aug. 17, 1968 Germany............... 1795162

[52] U.S. Cl.................. 260/154; 260/153; 260/155; 260/157; 260/158; 260/162; 260/163
[51] Int. Cl.[2].............. C09B 62/08; C09B 62/16; C09B 62/24; C09B 62/50
[58] Field of Search......... 260/153, 154, 162, 163, 260/158

[56] References Cited
UNITED STATES PATENTS

| | | | |
|---|---|---|---|
| 2,634,262 | 4/1953 | Piepenbrink et al. | 260/163 |
| 2,892,831 | 6/1959 | Stephen | 260/163 X |
| 3,019,217 | 1/1962 | Joyce | 260/163 |
| 3,097,197 | 7/1963 | Tilley et al. | 260/162 X |
| 3,117,957 | 1/1964 | Boyd et al. | 260/162 X |
| 3,234,207 | 2/1966 | Berner et al. | 260/162 |
| 3,290,282 | 12/1966 | Kissa | 260/154 X |
| 3,313,797 | 4/1967 | Kissa | 260/154 X |
| 3,321,457 | 5/1967 | Kissa | 260/154 |
| 3,324,105 | 6/1967 | Hanke et al. | 260/163 X |
| 3,325,469 | 6/1967 | Berrie et al. | 260/162 |
| 3,341,513 | 9/1967 | Wegmuller et al. | 260/162 X |
| 3,366,620 | 1/1968 | Hanke et al. | 260/163 |
| 3,414,579 | 12/1968 | Remy | 260/163 X |
| 3,468,873 | 9/1969 | Meininger et al. | 260/158 |
| 3,483,182 | 12/1969 | Sugiyama et al. | 260/163 |

OTHER PUBLICATIONS
Farbenfabriken, Chemical Abstracts, vol. 60, 16025, (1964).

*Primary Examiner*—Floyd D. Higel
*Attorney, Agent, or Firm*—Plumley and Tyner

[57] ABSTRACT

The invention relates to valuable new reactive dyestuffs of the general formula

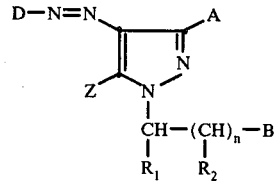

in which A stands for hydrogen, a methyl, phenyl, lower carbalkoxy, optionally substituted carboxamide or a carboxy group; B denotes a carboxy, lower carbalkoxy, optionally substituted carboxamide or nitrile group; Z means a hydroxy or amino group; $R_1$ and $R_2$ stand for identical or different radicals such as hydrogen or methyl; D denotes the radical of a diazo component containing a reactive group; and $n$ means the number 0 or 1; which are suitable for the dyeing and printing of materials containing hydroxyl or amide groups and for dyeing natural or regenerated cellulose fast to washing.

4 Claims, No Drawings

REACTIVE DYESTUFFS CONTAINING A SUBSTITUTED 1-METHYL OR 1-ETHYL PYRAZOLYL RADICAL

The invention relates to valuable new reactive dyestuffs of the general formula

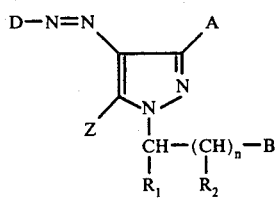

(I), in which A stands for hydrogen, a methyl, phenyl, lower carbalkoxy, optionally substituted carboxamide or a carboxy group; B denotes a carboxy, lower carbalkoxy, optionally substituted carboxamide or nitrile group; S means a hydroxy or amino group; $R_1$ and $R_2$ stand for identical or different radicals such as hydrogen or methyl; D denotes the radical of a diazo component containing a reactive group; and n means the number 0 or 1; the carboxamide groups may be mono-disubstituted, suitable substituents being primarily alkyl radicals with 1 to 4 carbon atoms.

The reactive groups of the radical D comprise those which contain one or more reactive groups or eliminatable substituents which, when the dyestuffs are applied to cellulose materials in the presence of acid-binding agents and optionally under the influence of heat, are capable of reacting with the hydroxyl groups of the cellulose, or when they are applied to superpolyamide fibres such as wool, are capable of reacting with the NH groups of these fibres, covalent bonds being formed. A large number of such fibre-reactive groupings is known from the literature.

Suitable reactive groups according to the invention which contain at least one eliminatable substituent linked to a heterocyclic or aliphatic radical are, inter alia, those containing at least one reactive substituent linked to a 5- or 6-membered heterocyclic ring, such as a monoazine, diazine, triazine, e.g. pyridine, pyrimidine, pyridazine, pyrazine, thiazine, oxazine or asym. or sym. triazine ring; or to a ring system of this type containing one or more fused aromatic rings, such as a quinoline, phthalazine, cinnoline, quinazoline, quinoxaline, acridine, phenazine and phenanthridine ring system; consequently, the 5- or 6-membered heterocyclic rings which contain at least one reactive substituent are preferably those which contain one or more nitrogen atoms and may contain fused 5- or, preferably, 6-membered carbocyclic rings. Reactive substituents on the heterocycle are, for example, halogen (Cl, Br or F), ammonium including hydrazinium, sulphonium, sulphonyl, azido-($NH_3$), thiocyanido, thio, thioether, hydroxyether, sulphinic acid and sulphonic acid. Individual examples are mono- or dihalo-sym.-triazinyl radicals, e.g. 2,4-dichlorotriazinyl-6-, 2-amino-4-chlorotriazinyl-6-; 2-alkylamino-4-chlorotriazinyl-6-, such as 2-methylamino-4-chlorotriazinyl-6-, 2-ethylamino- or 2-propyl-amino-4-chlorotriazinyl-6-, 2-β-hydroxyethylamino-4-chlorotriazinyl-6-, 2-di-β-hydroxyethylamino-4-chlorotriazinyl-6- and the corresponding sulphuric acid semiesters, 2-diethylamino-4-chlorotriazinyl-6-, 2-morpholino- or 2-piperidino-4-chlorotriazinyl-6-, 2-cyclohexylamino-4-chlorotriazinyl-6-; 2-arylamino- and subst. arylamino-4-chlorotriazinyl-6-, such as 2-phenylamino-4-chlorotriazinyl-6-, 2-(o-, m- or p-carboxy- or sulphophenyl)-amino-4-chlorotriazinyl-6-; 2-alkoxy-4-chlorotriazinyl-6-, such as 2-methoxy- or -ethoxy-4-chlorotriazinyl-6-, 2-(phenylsulphonylmethoxy)-4-chlorotriazinyl-6-; 2-aryloxy- and subst. aryloxy-4-chlorotriazinyl-6-, such as 2-phenoxy-4-chlorotriazinyl-6-, 2-(p-sulphophenyl)-oxy-4-chlorotriazinyl-6-, 2-(o-, m- or p-methyl- or methoxyphenyl)-oxy-4-chlorotriazinyl-6-; 2-alkyl-mercapto- or 2-arylmercapto- or 2-(subst. aryl)-mercapto-4-chlorotriazinyl-6-, such as 2-(β-hydroxyethyl)-mercapto-4-chlorotriazinyl-6-, 2-phenylmercapto-4-chlorotriazinyl-6-, 2-(4'-methyl-phenyl)-mercapto-4-chlorotriazinyl-6-, 2-(2',4'-dinitro)-phenylmercapto-4-chlorotriazinyl-6-, 2-methyl-4-chloro-triazinyl-6-, 2-phenyl-4-chlorotriazinyl-6-; mono-, di- or trihalopyrimidinyl radicals, such as 2,4-dichloropyrimidinyl-6-, 2,4,5-trichloropyrimidinyl-6-, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxy-pyrimidinyl-6-, 2,6-dichloropyrimidine-4-carbonyl-, 2,4-dichloropyrimidine-5-carbonyl-, 2-chloro-4-methylpyrimidine-5-carbonyl-, 2-methyl-4-chloropyrimidine-5-carbonyl-, 2-methylthio-4-fluoropyrimidine-5-carbonyl-, 6-methyl-2,4-dichloropyrimidine-5-carbonyl-, 2,4,6-trichloropyrimidine-5-carbonyl-, 2,4-dichloropyrimidine-5-sulphenyl-, 2-chloroquinoxaline-3-carbonyl-, 2- or 3-monochloroquinoxaline-6-carbonyl-, 2- or 3-monochloro-quinoxaline-6-sulphonyl-, 2,3-dichloroquinoxaline-6-carbonyl-, 2,3-dichloroquinoxaline-6-sulphonyl-, 1,4-dichlorophthalazine-6-sulphonyl- or -6-carbonyl-, 2,4-dichloroquinazoline-7- or -6-sulphonyl- or -carbonyl-, 2- or 3- or 4-(4',5'-dichloropyridazone-6'-yl-1')-phenylsulphonyl- or -carbonyl-, β-(4',5'-dichloropyridazone-6'-yl-1')-ethylcarbonyl, N-methyl-N-(2,4-dichlorotriazinyl-6-)-carbamyl-, N-methyl-N-(2-methylamino-4-chlorotriazinyl-6)-carbamyl-, N-methyl-N-(2-dimethylamino-4-chlorotriazinyl-6)-carbamyl-, N-methyl- or N-ethyl-N-(2,4-dichlorotriazinyl-6)-aminoacetyl-, N-methyl-N-(2,3-dichloroquinoxaline-6-sulphonyl)-aminoacetyl-, N-methyl-N-(2,3-dichloroquinoxaline-6-carbonyl)-aminoacetyl-, and the corresponding bromo- and fluoro derivatives of the above chloro-substituted heterocyclic radicals, including, for example, 2-fluoro-4-pyrimidinyl-, 2,6-difluoro-4-pyrimidinyl-, 2,6-difluoro-5-chloro-4-pyrimidinyl-, 2-fluoro-5,6-dichloro-4-pyrimidinyl-, 2,6-difluoro-5-methyl-4-pyrimidinyl-, 2,5-difluoro-6-methyl-4-pyrimidinyl-, 2-fluoro-5me-thyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5- bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-6-trifluoromethyl-4-pyrimidinyl; sulphonyl group-containing triazine radicals, such as 2,4-bis-(phenylsulphonyl)-triazinyl-6-, 2-(3'-carboxyphenyl)-sulphonyl-4-chlorotriazinyl-6-, 2-(3'-sulphophenyl)-sulphonyl-4-chlorotriazinyl-6-, 2,4-bis-(3'-carboxyphenylsulphonyl-1')-triazinyl-6-; sulphonyl, group-containing pyrimidine rings, such as 2-carboxymethylsulphonyl-pyrimidinyl-4, 2-methylsulphonyl-6-methyl-pyrimidinyl-4-, 2-methylsulphonyl-6-ethyl-pyrimidinyl-4, 2-phenylsulphonyl-5-chloro-6-methyl-pyrimidinyl-4, 2,6-bis-methylsulphonyl-pyrmidinyl-4, 2,6-bis-methylsulphonyl-5-chloropyrimidinyl- 4, 2,4-bis-methylsulphonyl-pyrimidine-5-sulphonyl, 2-methylsulphonyl-pyrimidinyl-4, 2-phenyl-sulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethyl-pyrimidinyl-4, 2-methylsulphonyl-4-chloro-6-methyl-pyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methyl-pyrimidinyl-4, 2-methylsulphonyl-6-chloro-pyrimidinyl-4, 2,6-bis-methyl-sulphonyl-5-chloro-pyrimidinyl-4, 2-methylsulphonyl-6-carboxy-pyrimidinyl-4, 2-methylsulphonyl-5-sulphopyrimidinyl-4, 2-methyl-sulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloropyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl-, 2,6-bis-(methylsulphonyl)-pyrimidine-4- or -5-carbonyl-, 2-ethylsulphonyl-6-chloropyrimidine-5-carbonyl-, 2,4-bis-(methylsulphonyl)-pyrimidine-5-sulphonyl-, 2-methylsulphonyl-4-chloro-6-methyl-pyrimidine-5-sulphonyl- or -carbonyl-; ammonium group-containing triazine rings, such as 2-trimethylammonium- 4-phenylamino- or -4-(o-, m- or p-sulphophenyl)-aminotriazinyl-6-, 2-1,1-dimethyl-hydrazinium)-4-phenylamino- or -4-(o-, m- or p-sulphophenyl)-aminotriazinyl-6-, 2-(2-isopropylidene-1,1-dimethyl)-hydrazinium-4-phenylamino- or -4-(o-, m- or p-sulphophenyl)-aminotriazinyl-6-, 2-N-aminopyrrolidinium- or 2-N-aminopiperidinium-4-phenyl-amino- or -4-(o-, m- or p-sulphophenyl)-aminotriazinyl-6-; furthermore, 4-phenylamino- or 4-(sulphophenylamino)-triazinyl-6- radicals containing 1,4-bis-aza-bicyclo-[2,2,2]-octane or 1,2-bis-aza-bicyclo-[0,3,3]-octane attached in a quaternary linkage in the 2-position via a nitrogen bond; 2-pyridinium-4-phenylamino- or -4-(o-, m- or p-sulphophenyl)-amino-triazinyl-6-and corresponding 2-oniumtriazinyl-6- radicals substituted in the 4-position by alkylamino groups, such as methylamino, ethylamino or β-hydroxyethylamino groups, or by alkoxy groups, such as methoxy or ethoxy; or aroxy groups such as phenoxy or sulphophenoxy groups; 2-chlorobenzothiazole-5- or -6-carbonyl or -5- or -6-sulphonyl, 2-arylsulphonyl- or -alkylsulphonyl-benzothiazole-5- or -6-carbonyl or -5- or -6-sulphonyl, such as 2-methylsulphonyl- or 2-ethylsulphonyl-benzothiazole-5- or -6-sulphonyl or -carbonyl, 2-phenylsulphonyl-benzothiazole-5- or -6-sulphonyl or -carbonyl and the corresponding 2-sulphonyl-benzothiazole-5- or -6-carbonyl- or -sulphonyl derivatives containing sulpho groups in the fused benzene ring; 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl- or -sulphonyl-, 2-chloro-4-methylthiazole-(1,3)-5-carbonyl- or -4- or -5-sulphonyl, N-oxide of 4-chloro- or 4-nitroquinoline-5-carbonyl.

Reactive groups of the aliphatic series should also be mentioned, such as acryloyl; mono-, di- or trichloroacryloyl, such as —CO—CH=CH—Cl, —CO—CCl=CH₂, —CO—CCl=CH—CH₃; furthermore —CO—CCl=λCH—COOH, —CO—CH=CCl—COOH, β-chloropropionyl, 3-phenylsulphonylpropionyl, 3-methylsulphonyl-propionyl, 3-phenylsulphonylpropionyl, β-sulphato-ethylaminosulphonyl, vinylsulphonyl, β-chloroethylsulphonyl, β-sulphatoethylsulphonyl, β-methylsulphonyl-ethylsulphonyl, β-phenylsulphonyl-ethylsulphonyl, 2-fluoro-2-chloro-3,3-difluorocyclobutane-1-carbonyl, 2,2,3,3,-tetrafluorocyclobutane-carbonyl-1 or -sulphonyl-1, β-(2,2,3,3,-tetrafluoro-cyclobutyl-1)-acryloyl, α- or β-bromoacryloyl, α- or β-alkyl- or -arylsulphonyl-acryloyl groups, such as α- or β-methylsulphonyl-acryloyl.

The new dyestuffs are obtained by combining the diazo compound of an amine of the formula $$D - NH_2$$

in which D has the same meaning as above, with at least 1 mol of a coupling component of the formula

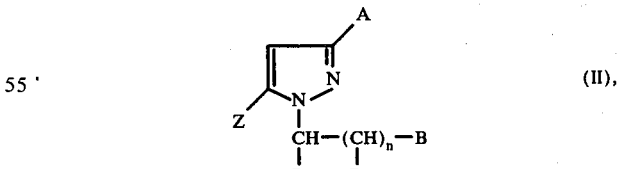

(II), in which A, B, Z, R₁, R₂ and n have the same meaning as above.

The coupling is carried out in a weakly acidic, neutral or alkaline medium, preferably in an aqueous medium, in known manner.

The compounds according to the invention can also be prepared by introducing in a dyestuff of the formula

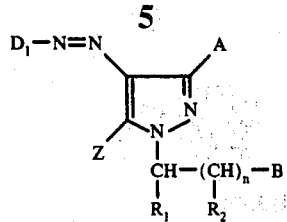

(Ia), in which $D_1$ represents the radical of a diazo component which is free from reactive groups, and A, B, Z, $R_1$, $R_2$ and $n$ have the same meaning as above, a reactive group into the radical $D_1$ by conventional methods, for example, by condensation or acylation, possibly only after liberation of an amino group by hydrolysis or reduction.

In particular, this process can be carried out by converting, in a dyestuff of the formula

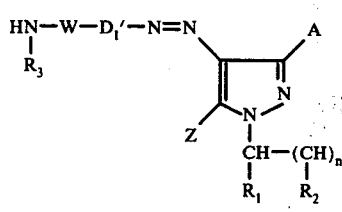

(Ib), in which A, B, Z, $R_1$, $R_2$ and $n$ have the same meaning as above; W represents a bridge member or a direct bond; $R_3$ stands for hydrogen or a methyl group; and $D_1'$ represents the arylene radical of a diazo component which is free from reactive groups, the grouping

—NH
|
$R_3$ by condensation with an at least bifunctional reactive component into a grouping

—N—X
|
$R_3$ in which $R_3$ has the same meaning as above, and X represents the radical of a reactive component.

Suitable bridge members W are, for example, the radicals —$CH_2$—, —$SO_2$—, —$CH_2$—CO—NH—, —$CH_2$—$CH_2$—NH—$SO_2$—, —$CH_2$—$CH_2$—N($CH_3$)—$SO_2$—, —$CH_2$—$CH_2$—NH—CO—, —$CH_2$—$CH_2$—N($CH_3$)CO—, but W is preferably a direct bond or —$CH_2$—.

Examples of radicals $D_1'$ are: phenylene-(1,3) or -(1,4), 2-sulpho-phenylene-(1,3) or -(1,4), 2-carboxy-phenylene-(1,4), 2- or 3-carboxy-phenylene-(1,3), 6-methoxy-4-sulpho-phenylene-(1,3), 5-methoxy-2-sulpho-phenylene-(1,4), 2-methyl-5-sulphophenylene-(1,3), 2-chloro-phenylene-(1,4), 6-sulpho-naphthylene-(1,4), 4,8-disulpho-naphthylene-(2,6)- or -(2,5), 2,2'-disulpho-stilbene-ylene-(4,4').

Examples of suitable pyrazole compounds are: 1-cyanomethyl-3-methyl-5-pyrazolone, 1-cyanomethyl-3-phenyl-5-pyrazolone, 1-cyanomethyl-3-carbethoxy-5-pyrazolone, 1-cyanomethyl-5-pyrazolone-3-carboxylic acid, 1-carbethoxymethyl-3-methyl-5-pyrazolone, 1-carboxymethyl-3-methyl-5-pyrazolone, 1-carboxymethyl-5-pyrazolone-3-carboxylic acid, 1-carbamoylmethyl-3-methyl-5-pyrazolone, 1-($\beta$-cyanoethyl)-3-methyl-5-pyrazolone, 1-($\beta$-carboxyethyl)-3-methyl-5-pyrazolone, 1-($\beta$-carboxyethyl)-3-phenyl-5-pyrazolone, 1-($\beta$-carbamoylethyl)-3-methyl-5-pyrazolone, 1-($\beta$-methylcarbamoylethyl)-3-methyl-5-pyrazolone, 1-($\beta$-dimethyl-carbamoylether)-3-methyl-5-pyrazolone, 1-[$\beta$-($\beta'$-hydroxyethylcarbamoyl)-ethyl]-3-methyl-5-pyrazolone, 1-[$\beta$-(bis-$\beta'$-hydroxyethylcarbamoyl)-ethyl]-3-methyl-5-pyrazolone, 1-($\beta$-cyanoethyl)-3-carbethoxy-5-pyrazolone, 1-($\beta$-cyanoethyl)-5-pyrazolone-3-carboxylic acid, 1-($\beta$-cyanoethyl)-3-carbamoyl-5-pyrazolone, 1-($\beta$-cyanoethyl)-3-methylcarbamoyl-5-pyrazolone, 1-($\beta$-cyanoethyl)-3-ethylcarbamoyl-5-pyrazolone, 1-($\beta$-cyanoethyl)-3-($\beta$-hydroxyethylcarbamoyl)-5-pyrazolone, 1-($\beta$-carboxyethyl)-5-pyrazolone-3-carboxylic acid, 1-($\beta$-carbamoylethyl)-3-carbamoyl-5-pyrazolone, 1-($\beta$-methylcarbamoylethyl)-3-methylcarbamoyl-5-pyrazolone, 1-($\beta$-dimethylcarbamoylethyl)- 3-dimethylcarbamoyl-5-pyrazolone, 1-[$\beta$-($\beta'$-hydroxyethylcarbamoyl)-ethyl]-3-($\beta$-hydroxyethylcarbamoyl)-5-pyrazolone, 1-($\omega$-cyano-isopropyl)-3-methyl-5-pyrazolone, 1-($\omega$-cyano-isopropyl)-5-pyrazolone-3-carboxylic acid, 1-($\omega$-cyano-isopropyl)-5-pyrazolone-3-carboxylic acid, 1-($\omega$-carboxy-isopropyl)-5-pyrazolone-3-carboxylic acid, 1-($\beta$-carboxypropyl)-3-methyl-5-pyrazolone, 1-carboxymethyl-3-methyl-5-amino-pyrazole, 1-($\beta$-cyanoethyl)-3-methyl-5-amino-pyrazole, 1-($\beta$-carboxyethyl)-3-methyl-5-amino-pyrazole, 1-($\beta$-cyanoethyl)-3-carbethoxy-5-amino-pyrazole, 1-($\beta$-cyanoethyl) -5-amino-pyrazole-3-carboxylic acid, 1-($\beta$-carboxyethyl)-5-aminopyrazole-3-carboxylic acid, 1-($\omega$-cyano-isopropyl)-3-methyl-5-amino-pyrazole, 1-($\omega$-carboxyisopropyl) -3-methyl-5-amino-pyrazole, 1-$\omega$-cyanoisopropyl)-3-carbethoxy-5-amino-pyrazole, 1-($\omega$-cyanoisopropyl)-5-aminopyrazole-3-carboxylic acid, 1-($\omega$-carboxy-isopropyl)-5-amino-pyrazole-3-carboxylic acid.

Suitable amines D—$NH_2$ are, for example, compounds of the type of the formulae (IIIa) - (IIIq):

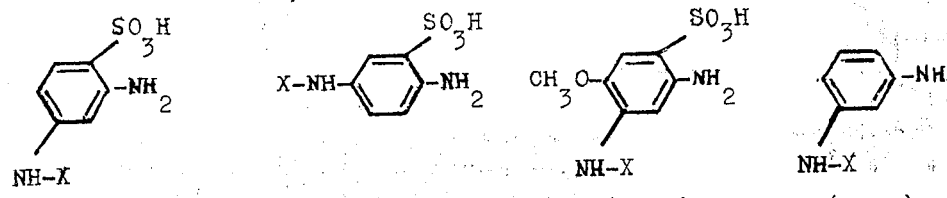
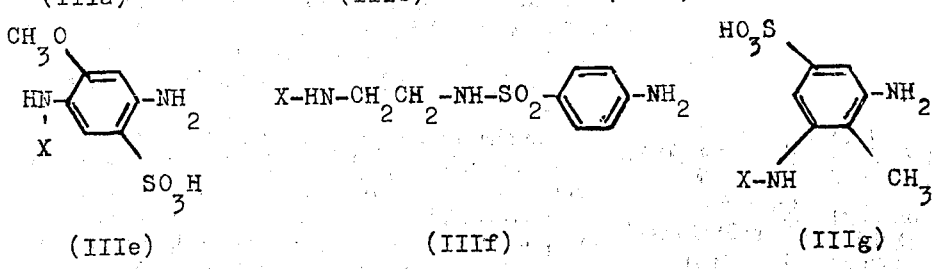
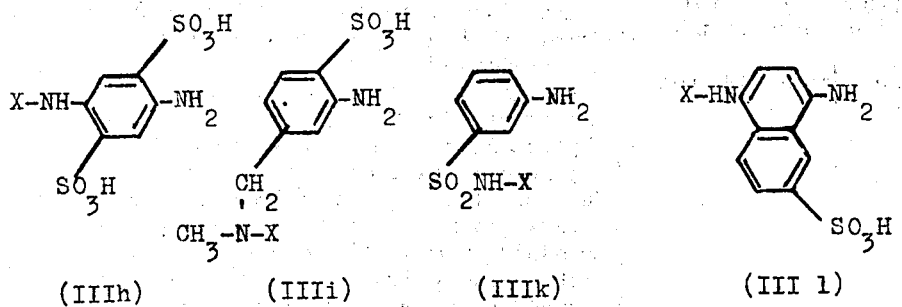
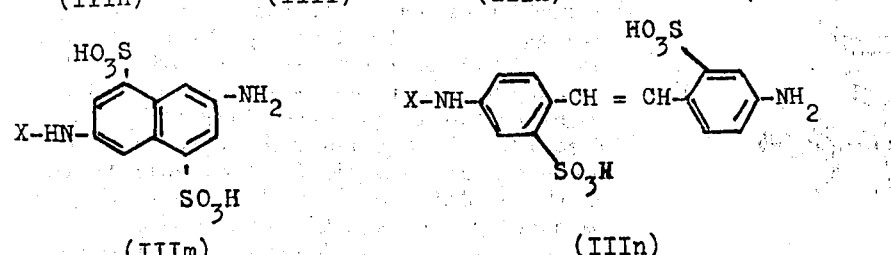
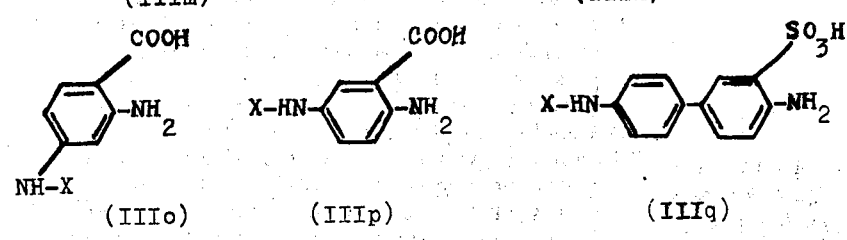
in which X stands for a reactive group
Other examples of amines D—NH₂ are compounds of the following formulae:
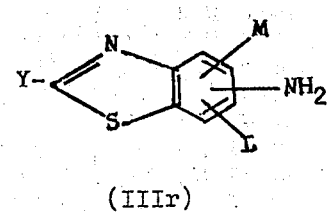
(IIIr)
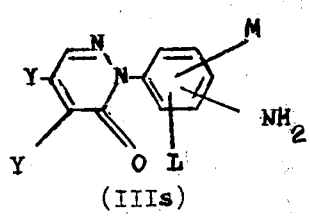
(IIIs)
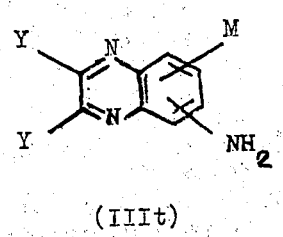
(IIIt)
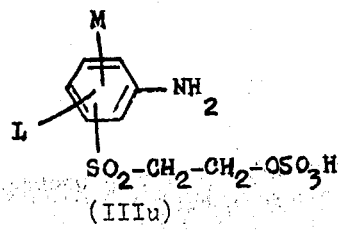
(IIIu)

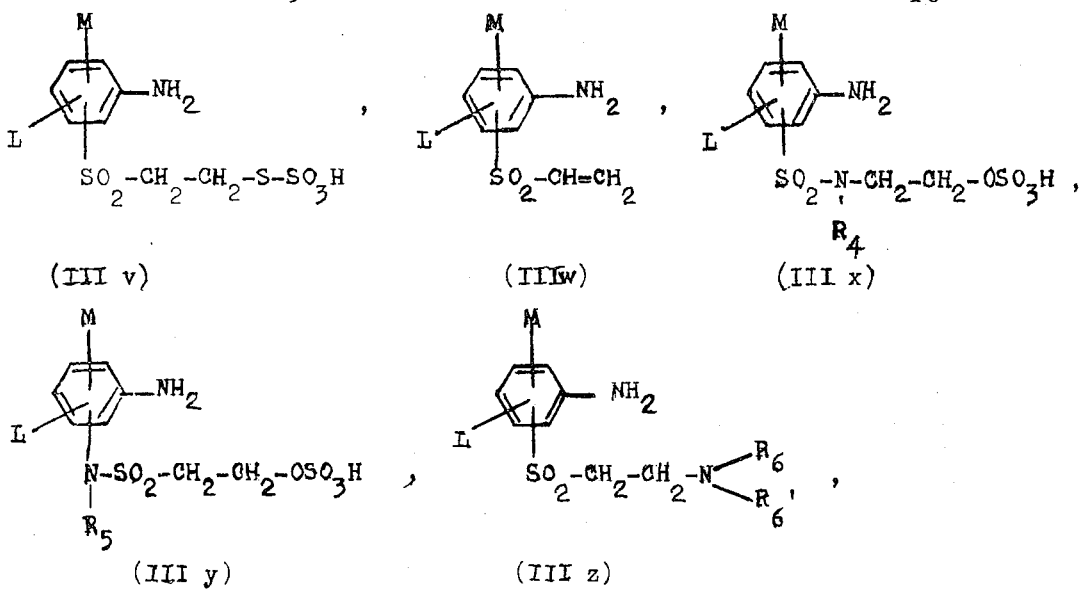

in which Y represents an eliminatable radical; M and D denote identical or different substituents, such as hydrogen, fluorine, chlorine, bromine, methyl, trifluoromethyl, nitro, sulphonic acid, carboxy, carboxamide, acetylamino, carbamoylamino or nitrile groups; $R_4$, $R_6$ and $R_6'$ denote a lower alkyl radical with 1 – 4 carbon atoms; and $R_5$ stands for hydrogen or methyl.

Examples of eliminatable radicals Y are, for example, halogen atoms, (chlorine, bromine or fluorine), ammonium including hydrazinium, sulphonium, sulphonyl, azido-($N_3$), thiocyanido, thio, ether, hyrdoxyether, sulphinic acid and sulphonic acid.

Further individual examples of amines D—$NH_2$ are the following compounds:
2-chloro- or 2-fluoro-6-amino-benzothiazole; 2-methylsulphonyl-, 2-ethylsulphonyl-, 2-propylsulphonyl-, 2-isopropylsulphonyl-, 2-butyl-sulphonyl-, 2-isobutylsulphonyl-, 2-β-chloroethylsulphonyl-, 2-β-hydroxy-ethylsulphonyl-, 2-β-sulphatoethylsulphonyl-, 2-benzylsulphonyl-, 2-phenylsulphonyl, 2-(4'-methyl-phenyl-methylsulphonyl)-, 2-(3'-chloro-phenylsulphonyl)-, 2-(4'-chlorophenylsulphonyl)-, 2-(2'-carboxyphenylsulphonyl)-, 2-(4'-carboxyphenylsulphonyl)-, 2-(2'-carboxy-3'-methyl-5'-chlorophenylsulphonyl)-, 2-[4'-(2''-carboxyvinyl)-phenylsulphonyl]-, 2-(3'-sulphophenylsulphonyl)-, 2-naphthylsulphonyl- and 2-benzothiazole-sulphonyl-6-amino-benzothiazole; 2-methylsulphonyl-5-cyano-6-amino, 2-methylsulphonyl-6-ethoxy-7-amino-, 2-methylsulphonyl-6-methoxy-7-amino-, 2-methylsulphonyl-5-methyl-6-amino-, 2-methylsulphonyl-5-ethyl-6-amino-, 2-methylsulphonyl-5-chloro-6-amino-, 2-methylsulphonyl-4-methyl-5-amino-6-chloro-, 2-methylsulphonyl-4-ethoxy-5-amino-6-chloro-, 2-methylsulphonyl-4,6-dimethyl-5-amino-, 2-methylsulphonyl-4-carboxy-5-amino-6-methoxy-, 2-methylsulphonyl-4-carboxy-6-amino-, 2-methylsulphonyl-4-methoxy-6-chloro-7-amino-, 2-methylsulfonyl-4-ethoxy-6-chloro-7-amino-, 2-methylsulphonyl-4-methyl-6-chloro-7-amino-, 2-methylsulphonyl-5-amino-6-methoxy-, 2-methylsulphonyl-5-amino-6-ethoxy-, 2-methylsulphonyl-5-amino-6-chloro-, 2-methylsulphonyl-5-amino-6-phenoxy-, 2-methylsulphonyl-5-amino-6-propoxy-, 2-methylsulphonyl-5-carboxy-7-amino-, 2-methylsulphonyl-5-amino-6-phenyl-, 2-methylsulphonyl-5-cyano-7-amino-, 2-methylsulphonyl-5-amino-6-bromo-, 2-methylsulphonyl-6-amino-7-sulpho-, 2-ethylsulphonyl-6-amino- and 2-ethylsulphonyl-6-amino-7-sulpho-benzothiazole; 2-chloro-6-aminobenzothiazole-sulphonic acid, 2-methylsulphonyl- or 2-ethylsulphonyl-6-amino-benzothiazole-sulphonic acid, 6-amino-2,3-dichloroquinoxaline, 3-amino-(β-sulphatoethylsulphonyl)-benzene, 3-amino-4-methoxy(β-sulphatoethylsulphonyl)-benzene, 4-amino-5-methoxy-2-methyl-(β-sulphatoethylsulphonyl)-benzene, 4-amino-(β-sulphatoethylsulphonyl)-benzene, 3-amino-4-methoxy-(β-diethylaminoethylsulphonyl)-benzene, 4-amino-(β-diethylaminoethylsulphonyl)-benzene, N-methyl-N(β-sulphatoethylsulphonyl)-phenylene-diamine-(1,4), 4,5-dichloro- or 4,5-dibromo-1-(4'-aminophenyl)-pyridazone-(6), 4,5-dichloro- or 4,5-dibromo-1-(4'-amino-2'-sulphophenyl)-pyridazone-(6), 4,5-dichloro- or 4,5-dibromo-1-(5'-amino-2'-sulphophenylamino)-pyridazone-(6).

If dyestuffs of the formula (Ia) are desired, suitable amines $D_1$—$NH_2$ are coupled with pyrazoles of the formula (II). Amines $D_1$—$NH_2$ are, for example:
4-acetamino-2-amino-benzene-sulfonic acid
5-nitro-2-amino-benzene-sulphonic acid
5-acetamino-2-amino-benzene-sulphonic acid
2-amino-4-methylaminomethyl-benzene-sulphonic acid
2-amino-5-methylaminomethyl-benzene-sulphonic acid
5-amino-2-methylaminomethyl-benzene-sulphonic acid
4- or 5-acetamino-2-amino-benzene-carboxylic acid
3- or 4-acetamino-1-amino-benzene
4-nitro-1-amino-benzene
4-nitro-2-chloro-1-amino-benzene
5-methoxy-2-acetamino-4-amino-benzene-sulphonic acid
1-amino-4-acetamino-naphthalene-6- or 7-sulphonic acid
6-nitro-2-amino-naphthalene-4,8-disulphonic acid
6-acetamino-1-amino-naphthalene-4,8-disulphonic acid
4-nitro-4'-aminostilbene-2,2'-disulphonic acid
4-acetylamino-4'-aminostilbene-2,2'-disulphonic acid
3-aminobenzene-sulphonamide 3- or 4-amino-benzene-sulphonic acid-(β-aminoethylamide)
4-(methylaminoacetylamino)-2-amino-benzene-sulphonic acid and
6-nitro-2-amino-benzothiazole.

The reaction of the dyestuffs of the formula (Ib) with reactive components $$X - Y' \qquad \text{IV.}$$

in which X has the same meaning as above and Y' represents a radical which can be split off as an anion, is carried out in known manner.

Reactive components of the formula (IV) suitable for this purposes are, for example; those from which the aforesaid reactive groups X are derived, i.e., generally speaking, the halides, especially the chlorides of the aforesaid acyl components X. From the large number of available compounds, the following are given by way of example: trihalo-sym.-triazines, such as cyanuric chloride and cyanuric bromide; dihalo-monoamino- and -mono-subst.amino-sym.-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)-aminotriazine, 2,6-dichloro-4-(2',3'-, -2',-4'-, -3',4'- or -3',5'-disulphophenyl)-aminotriazine; dihalo-alkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-oxytriazine; dihalo-alkylmercapto- and -arylmercapto-sym.-triazines, such as 2,6-dichloro-4-ethylmercapto-triazine, 2,6-dichloro-4-phenylmercaptotriazine, 2,6-dichloro-4-(p-methylphenyl)-mercaptotriazine; tetrahalo-pyrimidines, such as tetrachloro-, tetrabromo- or tetrafluoro-pyrimidine; 2,4,6-trihalo-pyrimidines, such as 2,4,6-trichloro-, -tribromo- or -trifluoro-pyrimidine; dihalo-pyrimidines, such as 2,4-dichloro-, -dibromo- or -difluoro-pyrimidine; 2,4,6-trichloro-5-nitro- or -5-methyl- or -5-carbomethoxy- or -5-carboethoxy- or -5-carboxymethyl- or -5-mono, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-pyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 2,6-difluoro-2,5-dichloro- or dibromo-pyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoro-pyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoro-pyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulphonyl-4-pyrimidine, 2,4-difluoro-5-phenyl-pyrimidine, 2,4-difluoro-5-carboxamidopyrimidine, 2,4-difluoro-5-carbomethoxypyrimidine, 2,4-difluoro-6-trifluoromethyl-pyrimidine, 2,4-difluoro-5-bromo-6-trifluoromethyl-pyrimidine, 2,4-difluoro-6-carboxamidopyrimidine, 2,4-difluoro-6-carbomethoxy-pyrimidine, 2,4-difluoro-6-phenyl-pyrimidine, 2,4-difluoro-6-cyano-pyrimidine, 2,4,6-trifluoro-5-methylsulphonyl-pyrimidine, 2,4-difluoro-5-sulphonamido-pyrimidine, 2,4-difluoro-5-chloro-5-carbomethoxypyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, 2,6-dichloropyrimidine-4-carboxylic acid chloride; pyrimidine reactive components with eliminatable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-trismethylsulphonylpyrimidine, 2,6-bis-methylsulphonyl-4,5-dichloropyrimidine, 2,4-bis-methylsulphonylpyrimidine-5-sulphonic acid chloride, 2-methyl-sulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methyl-pyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethyl-sulphonyl-4,5-dichloro-6-methylpyrimidine, 2-methylsulphonyl-4,6-dichloropyrimidine, 2,4,6-trismethylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4,6-bis-methylsulphonylpyrimidine, 4-methyl-sulphonyl-6-chloropyrimidine, 2-sulphoethylsulphonyl-4-chloro-6-methyl-pyrimidine, 2-methylsulphonyl-4-chloro-5-bromopyrimidine, 2-methyl-sulphonyl-4-chloro-5-bromo-6-methylpyrimidine, 2,4-bis-methylsulphonyl-5-chloropyrimidine, 2-phenylsulphonyl-4,5-dichloropyrimidine, 2-phenyl-sulphonyl-4,5-dichloro-6-methylpyrimidine, 2-carboxymethylsulphonyl-4,5-dichloro-6-methylpyrimidine, 2-(2'- or 3'- or 4'-carboxy-phenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyrimidine-5-carboxylic acid chloride- or -bromide, 2,6-bis-(methylsulphonyl)-4-chloropyrimidine-5-carboxylic acid chloride; further reactive components of the heterocyclic series with reactive sulphonyl substituents are, for example, 3,6-bis-phenylsulphonylpyridazine, 3-methylsulphonyl-6-chloropyridazine, 3,6-bistrichloromethylsulphonylpyridazine, 3,6-bis-methylsulphonyl-4-methylpyridazine, 2,5,6-tris-methylsulphonylpyrazine, 2,4-bismethylsulphonyl-1,3,5-triazine, 2,4-bis-methylsulphonyl- 6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4,6-tris-phenylsulphonyl-1,3,5-triazine, 2,4-bis-methylsulphonyl-quinazoline, 2,4-bis-trichloromethyl-sulphonyl-quinoline, 2,4-bis-carboxymethylsulphonyl-quinoline, 2,6-bis-(methylsulphonyl)-pyridine-4-carboxylic acid chloride and 1-(4'-chlorocarbonylphenyl- or 2'-chlorocarbonylethyl)-4,5-bis-methylsulphonyl-pyridazine-(6); further heterocyclic reactive components with mobile halogen are, inter alia, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromo compounds, 2,4-dichloroquinazoline-6- or -7-carboxylic acid chloride or -sulphonic acid chloride and the corresponding bromo compounds, 2- or 3- or 4-(4',5'-dichloropyridazone-6'-yl-1')-phenyl-sulphonic acid chloride or -carboxylic acid chloride and the corresponding bromo compounds, β-(4',5'-dichloropyridazone-6'-yl-1')-ethylcarboxylic acid chloride, 2-chloroquinoxaline-3-carboxylic acid chloride and the corresponding bromo compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylamino-triazinyl-6)-carbamic acid chloride, N-methyl- or N-ethyl-N-(2,4-dichlorotriazinyl-6)-aminoacetyl chloride, N-methyl-, N-ethyl- or N-hydroxyethyl-N-(2,3-dichloroquinoxaline-6-sulphonyl- or -6-carbonyl)-aminoacetylchloride and the corresponding bromo derivatives; further 2-chlorobenzothiazole-5- or -6-carboxylic acid chloride or -5- or -6-sulphonic acid chloride and the corresponding bromo compounds; 2-arylsulphonyl- or 2-alkyl-sulphonyl-benzothiazole-5- or -6-carboxylic acid chloride or -5- or -6-sulphonic acid chloride, such as 2-methylsulphonyl- or 2-ethylsulphonyl- or 2-phenylsulphonyl-benzothiazole-5- or -6-sulphonic acid chloride or -5- or -6-carboxylic acid chloride and the corresponding 2-sulphonylbenzothiazole derivatives containing sulphonic acid groups in the fused benzene ring, 3,5-bis-methylsulphonylisothiazole-4-carboxylic acid chloride, 2-chlorobenzoxazole-5- or -6-carboxylic acid chloride or -sulphonic acid chloride and the corresponding bromo derivatives, 2-chlorobenzimidazole-5- or -6-carboxylic acid chloride or -sulphonic acid chloride and the corresponding bromo derivatives, 2-chloro-1-methylbenzimidazole-5- or -6-carboxylic acid chloride or -sulphonic acid chloride and the corresponding bromo derivatives, 2-chloro-4-methylthiazole-(1,3)-5-carboxylic acid chloride or -4- or -5-sulphonic acid chloride, 2-chlorothiazole-4- or -5-sulphonic acid chloride and the corresponding bromo derivatives.

Examples from the series of aliphatic reactive components are: acrylic acid chloride, mono-, di- or trichloroacrylic acid chloride, 3-chloropropionic acid chloride, 3-phenylsulphonyl-propionic acid chloride, 3-methylsulphonylpropionic acid chloride, 3-ethylsulphonyl-propionic acid chloride, 3-chloroethane-sulphochloride, chloromethane-sulphochloride, 2-chloroacetylchloride, 2,2,3,3-tetrafluorocyclobutane-1-carboxylic acid chloride, β-(2,2,3,3-tetrafluorocyclobutyl-1)-acrylic acid chloride, β-(2,3,3-trifluoro-2-chlorocyclobutane-1)-carboxylic acid chloride, β-methyl-sulphonylacrylic acid chloride, α-methylsulphonyl-acrylic acid chloride, α-bromoacrylic acid chloride and β-bromoacrylic acid chloride.

If the conversion leads to dyestuffs which contain more than one reactive group in the radical X or in another place of the dyestuff molecule, then these may be partially replaced with other radicals, for example, amino radicals which, in turn, may contain reactive groups, e.g. in the form of esterified alkoxy groups. In principle, the presence of two or more different reactive groups in the dyestuff is possible.

These condensation reactions are generally carried out in an aqueous or organic medium and in the alkaline, neutral or weakly acidic range.

If water-soluble dyestuffs are desired, it is expedient, for reasons of solubility, to select the diazo and coupling components in such a manner that at least one carboxyl or sulphonic acid group is contained in the final product.

Preferred compounds within the scope of the new dyestuffs correspond to the following formulae:

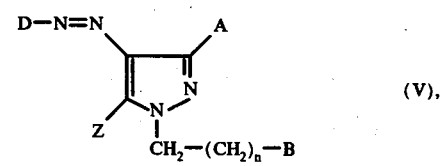

in which A, B, D, Z, and n have the same meaning as in formula (I);

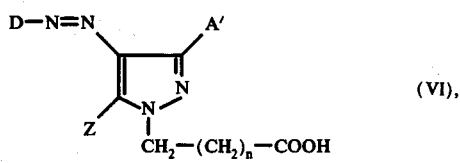

in which A' denotes a methyl or carboxyl group, and D, Z, and n have the same meaning as in formula (I);

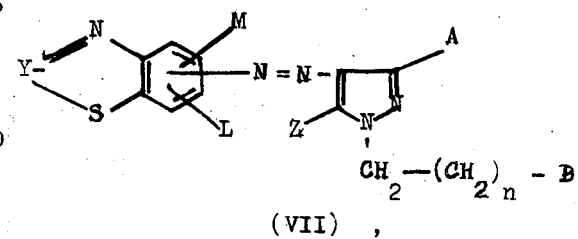

in which A, B, Z, and n have the same meaning as in formula (I); L, M and Y have the same meaning as formula (IIIr); and, in particular, Y stands for a halogen atom or a sulphonyl radical;

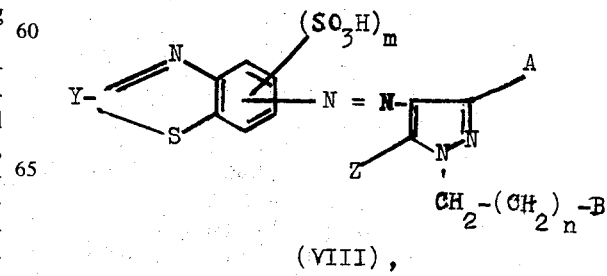

in which *m* stands for the number 0 or 1; A, B, Z and *n* have the same meaning as in formula (I); Y has the same meaning as in the formulae (IIIr) to (IIIt); and, in particular, Y stands for a halogen atom or a sulphonyl radical;

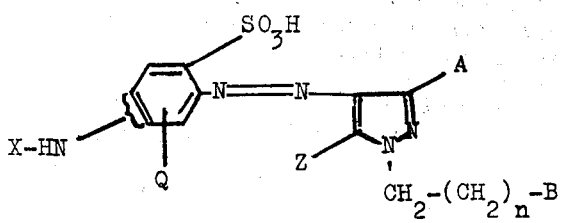

in which Q stands for hydrogen, methyl, methoxy or a sulphonic acid group; A, B, Z and *n* have the same meaning as in formula (I); and X has the same meaning as in the formulae (IIIa) to (IIIq);

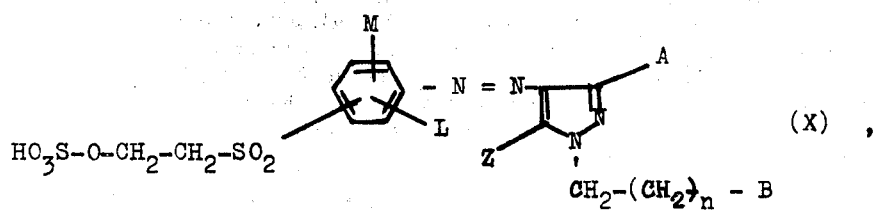

in which A, B, Z, and *n* have the same meaning as in formula (I), and L and M have the same meaning as in the formulae (IIIr) to (IIIz);

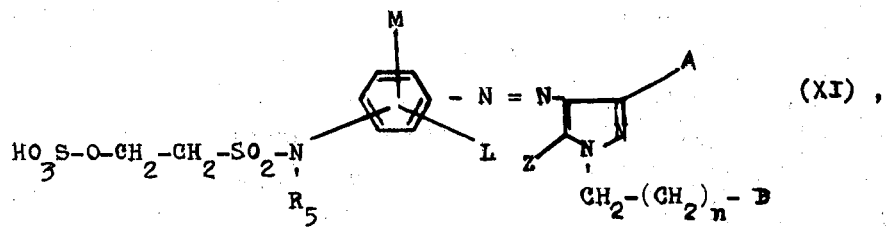

in which A, B, Z and *n* have the same meaning as formula (I), and $R_5$, L and M have the same meaning as in formula (IIIy);

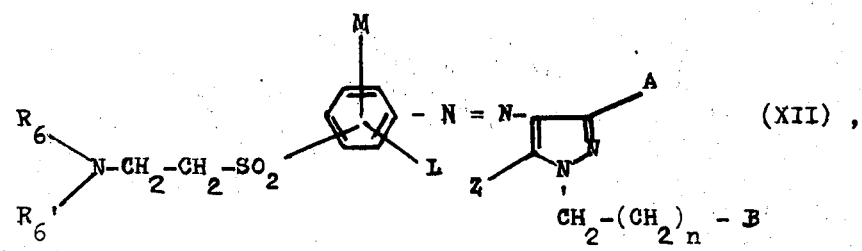

in which A, B, Z and *n* have the same meaning as in formula (I), and $R_6'$, L and M have the same meaning as in formula (IIIz).

The new dyestuffs are suitable for the dyeing and printing of materials containing hydroxyl or amide groups, such as textile fibres, filaments and fabrics of wool, silk, synthetic polyamide and polyurethane fibres, and for dyeing natural or regenerated cellulose fast to washing; the treatment of cellulose materials is expediently carried out in the presence of acid-binding agents and possibly under the influence of heat by the methods known for reactive dyestuffs.

In the following Examples the parts are parts by weight; the temperatures are given in degrees Centigrade.

EXAMPLE 1

22.8 Parts 2-methylsulphonyl-6-amino-benzothiazole are stirred in 150 parts of ice-water and 25 parts by volume of concentrated hydrochloric acid. A solution of 7 parts sodium nitrite in 20 parts of water is added thereto in one jet. The diazo compound dissolves with a yellow colour. After removing the excess of nitrous acid, the diazo solution is added to a neutral solution of 20 parts 1-($\beta$-carboxyethyl)-5-pyrazolone-3-carboxylic acid in 100 parts of water, the pH being kept between 4 and 6 by the dropwise addition of a sodium carbonate solution. The coupling is rapidly completed. The yellow coupling solution is evaporated to dryness in a vacuum at a bath temperature of 60°. The resultant dyestuff corresponds to the formula

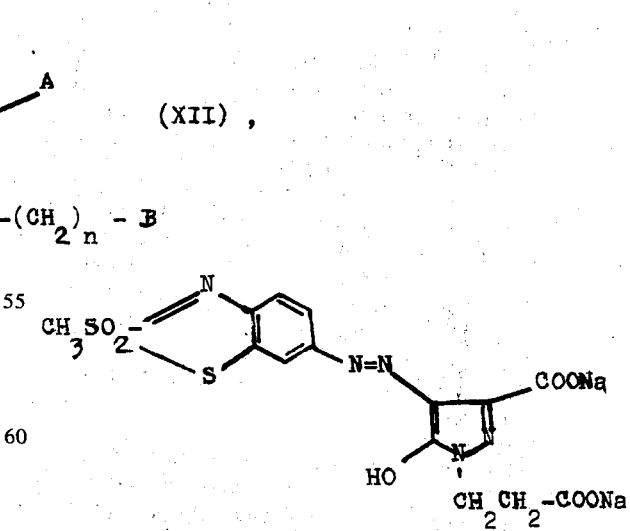

When a cotton nettle cloth is printed with a printing paste which contains, per kilogram, 10 g of the dyestuff, 100 g urea, 300 ml of water, 500 g of an alginate thickening agent (60 g sodium alginate per kg of thickening agent), and 10 g sodium carbonate, and which has been made up with water to 1 kilogram, the material is then dried, steamed at 103° for 1 minute, rinsed with hot water and soaped with boiling, then an intense golden yellow print of good fastness to wet processing and light is obtained; the unfixed dyestuff is very easily washed out.

Valuable yellow reactive dyestuffs are also obtained when the procedure described in the present Example is followed, but with the use of the diazo and coupling components set out in the following Table.

Table of Example 1

| Diazo component | Coupling component |
|---|---|
| 2-methylsulphonyl-6-aminobenzothiazole | 1-(β-cyanoethyl)-5-pyrazolone-3-carboxylic acid |
| '' | 1-(β-carboxyethyl)-3-methyl-5-pyrazolone |
| '' | 1-carboxymethyl-3-methyl-5-pyrazolone |
| '' | 1-carboxymethyl-5-pyrazolone-3-carboxylic acid |
| '' | 1-(ω-carboxyisopropyl)-3-methyl-5-pyrazolone |
| '' | 1-(ω-carboxyisopropyl)-5-pyrazolone-3-carboxylic acid |
| '' | 1-(β-carboxypropyl)-3-methyl-5-pyrazolone |
| '' | 1-carboxymethyl-5-pyrazolone |
| '' | 1-(β-carboxyethyl)-3-methyl-5-aminopyrazole |
| '' | 1-(β-carboxyethyl)-5-aminopyrazole-3-carboxylic acid |
| '' | 1-(ω-carboxy-isopropyl)-3-methyl-5-aminopyrazole |
| '' | 1-(ω-carboxy-isopropyl)-5-aminopyrazole-3-carboxylic acid |
| 2-ethylsulphonyl-6-aminobenzothiazole | 1-(β-cyanoethyl)-5-pyrazolone-3-carboxylic acid |
| '' | 1-(β-carboxyethyl)-5-pyrazolone-3-carboxylic acid |
| '' | 1-(β-carboxyethyl)-3-methyl-5-pyrazolone |
| '' | 1-carboxymethyl-3-methyl-5-pyrazolone |
| '' | 1-carboxymethyl-5-pyrazolone-3-carboxylic acid |
| '' | 1-(ω-carboxyisopropyl)-5-pyrazolone-3-carboxylic acid |
| '' | 1-(β-carboxypropyl)-3-methyl-5-pyrazolone |
| '' | 1-carboxymethyl-5-pyrazolone |
| '' | 1-(ω-carboxyisopropyl)-3-methyl-5-pyrazolone |
| 2-ethylsulphonyl-6-amino-benzothiazole | 1-(β-carboxyethyl)-3-methyl-5-aminopyrazole |
| '' | 1-(β-carboxyethyl)-5-aminopyrazole-3-carboxylic acid |
| '' | 1-(ω-carboxy-isopropyl)-3-methyl-5-aminopyrazole |
| '' | 1-(ω-carboxy-isopropyl)-5-aminopyrazole-3-carboxylic acid |
| 2-methylsulphonyl- or 2-ethylsulphonyl-6-amino-benzothiazole-7-sulphonic acid | 1-(β-cyanoethyl)-5-pyrazolone-3-carboxylic acid |
| '' | 1-(β-carboxyethyl)-3-methyl-5-pyrazolone |
| '' | 1-carboxymethyl-3-methyl-5-pyrazolone |
| '' | 1-carboxymethyl-5-pyrazolone-3-carboxylic acid |
| '' | 1-(ω-carboxyisopropyl)-3-methyl-5-pyrazolone |
| '' | 1-(ω-carboxyisopropyl)-5-pyrazolone-3-carboxylic acid |
| '' | 1-(β-carboxypropyl)-3-methyl-5-pyrazolone |
| '' | 1-carboxymethyl-5-pyrazolone |
| '' | 1-(ω-carboxyethyl)-3-phenyl-5-pyrazolone |
| '' | 1-(β-carboxyethyl)-3-methyl-5-aminopyrazole |
| '' | 1-(β-carboxyethyl)-5-aminopyrazole-3-carboxylic acid |
| '' | 1-(ω-carboxy-isopropyl)-3-methyl-5-aminopyrazole |
| '' | 1-(ω-carboxy-isopropyl)-5-aminopyrazole-3-carboxylic acid |

Further valuable dyestuffs can be obtained by replacing the diazo components mentioned in the Table with 2-chloro-6-amino-benzothiazole, 2-chloro-6-amino-benzothiazole-7-sulphonic acid, 2-methylsulphonyl-5-amino-6-methoxy-benzothiazole, thiazole, 2-alkylsulphonyl-6-amino-7-methoxy-benzothiazole, 2-alkylsulphonyl-6-methoxy-7-amino-benzothiazole, 2-alkylsulphonyl-5-methyl-6-amino-benzothiazole, 2-alkylsulphonyl-6-methoxy-5-amino-benzothiazole, 2-alkylsulphonyl-6-amino-7-methyl-benzothiazole, 2-alkylsulphonyl-4-alkoxy-5-amino-6-chlorobenzothiazole, 2-n-propylsulphonyl-6-amino-benzothiazole and 2-(4'-carboxyphenylsulphonyl)-6-amino-benzothiazole.

EXAMPLE 2

33.7 Parts 4-[2',6'-difluoro-5'-chloro-pyrimidinyl-(4')-amino]-2-aminobenzene-sulphonic acid are dissolved in 1000 parts of water with the addition of a dilute sodium carbonate solution in a neutral reaction. A solution of 7 parts sodium nitrite in 30 parts of water is added thereto. The mixture is poured into 30 parts of concentrated hydrochloric acid and 50 parts of ice, care being taken by the addition of ice that the temperature does not exceed 5°. The diazo compound is partially precipitated in the form of yellow needles. After 5 minutes, a possible excess of nitrous acid is destroyed by the addition of amino-sulphonic acid. The diazotized material is slowly poured into a neutral solution of 18 parts 1-(β-cyanoethyl)-5-pyrazolone-3-carboxylic acid in 100 parts of water, the pH of the coupling mixture being kept between 4 and 6 by the dropwise addition of a sodium acetate solution.

The resultant dyestuff of the formula

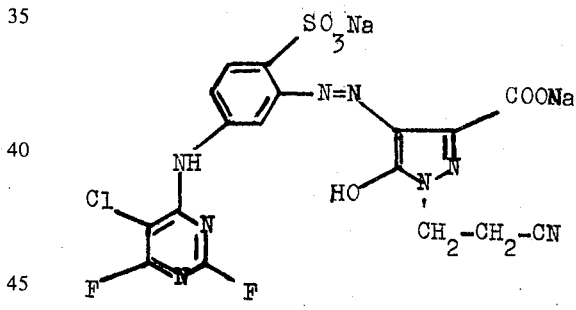

is salted out by the addition of 10% sodium chloride and dried at 40° in a vacuum. It dyes cotton by the exhaust process in the presence of sodium carbonate in clear greenish yellow shades.

The equally valuable yellow dyestuffs set out in the following Table can be obtained in a similar manner by using the specified diazo and coupling components:

| Diazo component | Coupling component | shade |
|---|---|---|
| 4-[2',6'-difluoro-5'-chloro-pyrimidinyl-(4')-amino]-2-amino-benzene-sulphonic acid | 1-(β-carboxyethyl)-5-pyrazolone-3-carboxylic acid | greenish yellow |
| 4-[2'-methylsulphonyl-6'-methyl-5'-chloro-pyrimidinyl-(4')-amino]-2-amino-benzene sulphonic acid | '' | '' |
| 4-[2',5',6'-trichloro-pyrimidinyl-(4')-amino]-2-amino-benzene-sulphonic acid | '' | '' |
| 4-[2',4'-dichloro-1,3,5-triazinyl-(6')-amino]-2-amino-benzene sulphonic acid | '' | '' |

-continued

| Diazo component | Coupling component | shade |
| --- | --- | --- |
| 4-[2'-chloro-4'-amino-1,3,5-triazinyl-(6')-amino]-2-amino-benzene sulphonic acid | " | " |
| 4-[2'-chloro-4'-methoxy-1,3,5-triazinyl-(6')-amino]-2-amino-benzene sulphonic acid | " | " |
| 4-[2'-fluoro-4'-methoxy-1,3,5-triazinyl-(6')-amino]-2-amino-benzene sulphonic acid | " | " |
| 5-[2',6'-difluoro-5'-chloro-pyrimidinyl-(4')-amino]-2-amino-benzene sulphonic acid | " | golden yellow |
| 5-[2'-methylsulphonyl-6'-methyl-5'-chloro-pyrimidinyl-(4')-amino-benzene sulphonic acid | " | " |

Further valuable yellow dyestuffs can be obtained by coupling the diazo components specified in the above Table, instead of with 1-(β-carboxyethyl)-5-pyrazolone-3-carboxylic acid, with 1-(β-cyanoethyl-5-pyrazolone-3-carboxylic acid, 1-(β-carboxyethyl)-3-methyl-5-pyrazolone, 1-carboxyme-thyl-3-methyl-5-pyrazolone, 1-carboxyme-thyl-5-pyrazolone-3-carboxylic acid, 1-(ω-carboxyisopropyl)-3-methyl-5-pyrazolone, 1-(ω-carboxyisopropyl)-5-pyrazolone-3-carboxylic acid, 1-carboxymethyl-5-pyrazolone, 1-(β-carboxyethyl)-3-phenyl-5-pyrazolone, 1-(β-carboxyethyl)-3-methyl-5-aminopyrazole, 1-(β-carboxyethyl)-5-aminopyrazole-3-carboxylic acid, 1-(ω-carboxyisopropyl)-3-methyl-5-aminopyrazole, 1-(ω-carboxyisopropyl)-5-aminopyrazole-3-carboxylic acid or 1-(β-cyanoethyl)-3-methyl-5-aminopyrazole.

EXAMPLE 3

23 Parts 2-amino-4-acetylamino-benzene-sulphonic acid are diazotized. The diazo solution is added dropwise to a solution of 20 parts 1-(β-carboxyethyl)-5-pyrazolone-3-carboxylic acid and 35 parts sodium carbonate in 200 parts of water. The coupling solution is adjusted to 2N with a concentrated sodium hydroxide solution and then stirred at 95° for 1 hour. Hydrochloric acid is then added until pH 3 prevails, and the aminoazo dyestuff formed is filtered off with suction. The paste is dissolved in 1000 parts of water at pH 6 and, after the addition of 26.1 parts 2,3-dichloroquinoxaline-6-carboxylic acid chloride, the mixture is stirred at 45° for 1 hour, the pH being kept between 4.5 and 6 by the dropwise addition of a sodium carbonate solution. The resultant reactive dyestuff of the formula

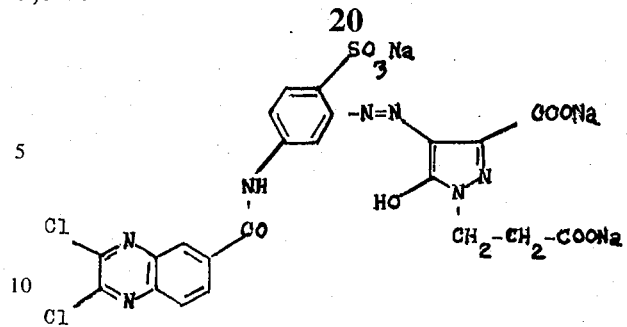

is then salted out with 10% sodium chloride. It is filtered off with suction and dried at 50°. The dyestuff so obtained dyes cotton in the presence of sodium carbonate in a very clear greenish yellow shade.

The same dyestuff can also be obtained, when 1-(β-cyanoethyl)-5-pyrazolone-3-carboxylic acid ethyl ester is used as coupling component, as both acid functions of the pyrazolone are converted into carboxy groups during the hydrolysis of the acetamino group.

Other valuable dyestuffs of virtually the same shade are obtained, when the aminoazo dyestuff is reacted, instead of with 26.1 parts 2,3-dichloroquinoxaline-6-carboxylic acid chloride, with equivalent amounts of the following acid chlorides:

1,4-dichlorophthalazine-6-carboxylic acid chloride
2-methylsulphonyl-benzothiazole-5-carboxylic acid chloride
2,4,6-trichloro-pyrimidine-5-carboxylic acid chloride
2,5-bismethylsulphonyl-isothiazole-4-carboxylic acid chloride
3-methylsulphonyl-propionyl chloride
3-phenylsulphonyl-propionyl chloride
3-(4',5'-dichloropyridazone-6'-yl-1')-propionyl chloride
2,2,3,3-tetrafluorocyclobutane-1-carboxylic acid chloride
2,3,3-trifluoro-2-chloro-cyclobutane-1-carboxylic acid chloride
β-(2,2,3,3-tetrafluorocyclobutyl-1)-acrylic acid chloride
β-(2,3,3-trifluoro-2-chloro-cyclobutyl-1)-acrylic acid chloride
α-bromoacrylic acid chloride

EXAMPLE 4

When the process is carried out according to Example 3, but using 23 parts 5-acetamino-2-aminobenzenesulphonic acid as diazo component, then the structurally isomeric dyestuff of the formula

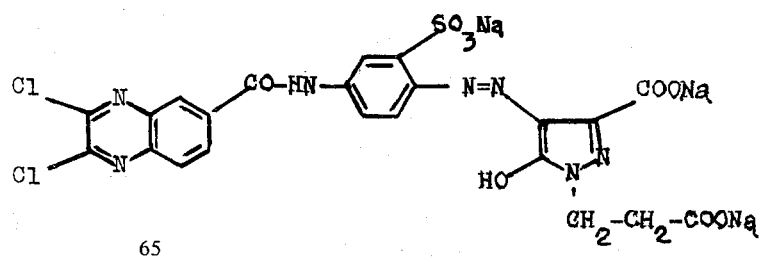

is obtained, which dyes cotton in a golden yellow shade by the exhaust process in the presence of sodium carbonate.

EXAMPLE 5

18 Parts by weight of the potassium salt of 3-(N-methyl-N-ethionylamino)-1-aminobenzene (cf. German published specification No. 1,204,762) are dissolved cold in 150 parts of water, the solution is mixed with 30 parts by volume of 5N hydrochloric acid and diazotized at 0° – 5°. When the diazotization is completed, the pH value of this solution is adjusted to 6 to 6.5 with the aid of sodium hydrogen carbonate. A neutral solution of 9.5 parts 1-(β-carboxyethyl)-3-methyl-5-pyrazolone in 50 parts of water is then added. When the coupling is completed, the dyestuff is salted out, filtered off and dried. The resultant yellow reactive dyestuff corresponds to the formula

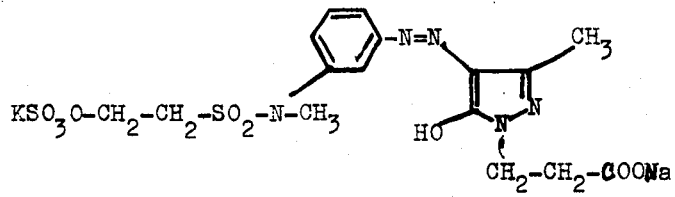

Yellow prints are obtained on cotton with printing pastes thickened with alginate, and with the addition of alkali.

Further valuable dyestuffs are obtained by following the procedure of Example 5, but replacing the diazo and coupling components there mentioned with equivalent amounts of the diazo and coupling components specified in the following Table.

Table of Example 5

| Diazo component | Coupling component | Shade |
|---|---|---|
| 4-amino-1-(β-sulphatoethyl-sulphonyl)-benzene | 1-(β-carboxyethyl)-5-pyrazolone-3-carboxylic acid | yellow |
| " | 1-(β-carboxyethyl)-3-methyl-5-pyrazolone | " |
| " | 1-carboxymethyl-3-methyl-5-pyrazolone | " |
| 4-amino-2-methyl-5-methoxy-1-(β-sulphatoethylsulphonyl)-benzene | " | golden-yellow |
| " | 1-(β-carboxyethyl)-5-pyrazolone-3-carboxylic acid | " |
| " | 1-(β-carboxyethyl)-3-methyl-5-pyrazolone | " |
| 4-amino-2,5-bis-methoxy-1-(β-sulphatoethylsulphonyl)-benzene | " | " |
| " | 1-(β-carboxyethyl)-5-pyrazolone-3-carboxylic acid | " |
| " | 1-carboxymethyl-3-methyl-5-pyrazolone | " |
| 4-amino-1-(β-diethylaminoethylsulphonyl)-benzene | 1-(β-carboxyethyl)-5-pyrazolone-3-carboxylic acid | yellow |
| 4-chloro-3-(N-methyl-N-ethionylamino)-1-amino-benzene | 1-carboxymethyl-5-pyrazolone-3-carboxylic acid | " |
| " | 1-(β-carboxyethyl)-5-pyrazolone-3-carboxylic acid | " |

EXAMPLE 6

21.6 Parts 4-methylaminomethyl-2-aminobenzene-sulphonic acid are dissolved in 125 parts of ice-water and 21 parts by volume of concentrated hydrochloric acid and diazotized with 6.9 parts sodium nitrite. The diazo solution is poured into a solution of 15.1 parts 1-(β-cyanoethyl)-3-methyl-5-pyrazolone and 30 parts of sodium carbonate in 200 parts of water. The pH is adjusted to 7 – 8 with the aid of hydrochloric acid. The aminoazo compound is acylated with 18.4 parts cyanuric chloride at 0° – 5°, the pH being kept constant by the dropwise addition of a sodium carbonate solution. The reactive dyestuff is salted out with sodium chloride, filtered off with suction and dried. The dyestuff which corresponds to the formula

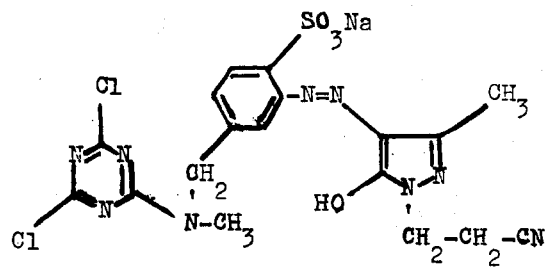

dyes cotton in clear, strongly greenish shades.

EXAMPLE 7

The diazo solution of 23 parts 2-amino-5-acetylaminobenzene-sulphonic acid is added dropwise to a solution of 15.6 parts 1-carboxymethyl-3-methyl-5-pyrazolone and 35 parts sodium carbonate in 200 parts of water. The coupling solution is adjusted to 2N by means of a concentrated sodium hydroxide solution and subsequently stirred at 95° for 1 hour. Hydrochloric acid is then added until pH 3 prevails and the precipitated aminoazo dyestuff is filtered off with suction. The paste is dissolved in 1000 parts of water at pH 6. After the addition of 26.1 parts 2,3-dichloroquinoxaline-6-carboxylic acid chloride, the mixture is stirred at 45° for 1 hour, the pH being kept between 4.5 and 6 by the dropwise addition of a sodium carbonate solution. The resultant reactive dyestuff of the formula

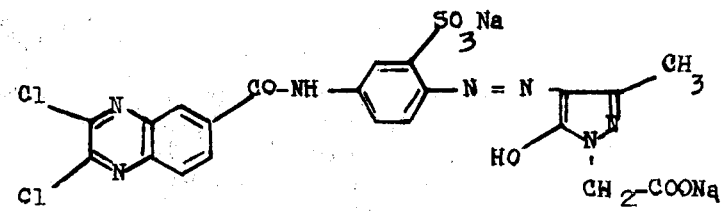

is then salted out with 10% sodium chloride. It is filtered off with suction, and dried at 50°. The dyestuff so obtained yields on cotton from a long bath in the presence of sodium carbonate an intense yellow dyeing of very good fastness to light.

The same dyestuff can also be obtained with the use of 1-carbethoxymethyl-3-methyl-5-pyrazolone as coupling component.

Further valuable dyestuffs of virtually the same shade are obtained when the aminoazo dyestuff is reacted, instead of with 26.1 parts 2.3-dichloroquinoxaline-6-carboxylic acid chloride, with equivalent amounts of the following acid chlorides:
1,4-dichlorophthalazine-6-carboxylic acid chloride
2-methylsulphonyl-benzothiazole-5-carboxylic acid chloride
2,4,6-trichloro-pyrimidine-5-carboxylic acid chloride
2,5-bismethylsulphonyl-isothiazole-4-carboxylic acid chloride
3-methylsulphonyl-propionyl chloride
3-phenylsulphonyl-propionyl chloride
3-(4',5'-dichloropyridazone-6'-yl-1)-propionyl chloride
2,2,3,3-tetrafluorocyclobutane-1-carboxylic acid chloride
2,3,3-trifluoro-2-chloro-cyclobutane-1-carboxylic acid chloride
β-(2,2,3,3-tetrafluorocyclobutyl-1)-acrylic acid chloride
β-(2,3,3-trifluoro-2-chloro-cyclobutyl-1)-acrylic acid chloride
α-bromoacrylic acid chloride

EXAMPLE 8

When the process is carried out according to Example 7, but using 17.0 parts 1-(β-carboxyethyl)-3-methyl-5-pyrazolone as coupling component, extremely valuable dyestuffs are also obtained corresponding, for example, to the formula

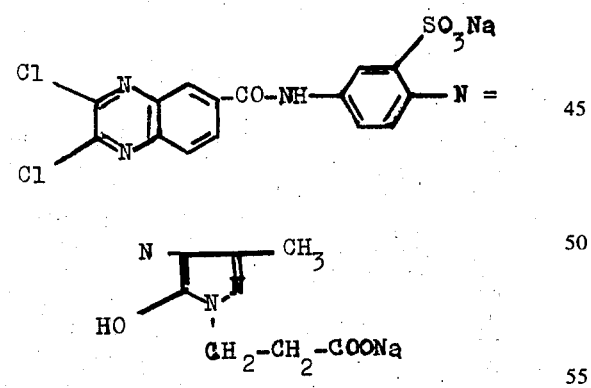

EXAMPLE 9

When the process is carried out according to Examples 7 and 8, but using 23 parts 4-acetamino-2-aminobenzenesulphonic acid as diazo component, structurally isomeric yellow dyestuffs of extremely valuable properties are obtained.

EXAMPLE 10

When the process is carried out according to Examples 7 - 9, but using 1-carboxymethyl-3-methyl-5-aminopyrazole or 1-(β-carboxyethyl)-3-methyl-5-amino-pyrazole as coupling component, extremely valuable dyestuffs, e.g. of the formula

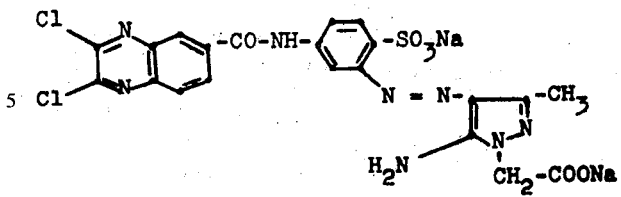

are also obtained.

We claim:

1. Reactive dyestuff of the formula

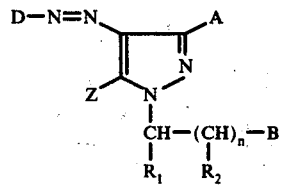

in which A is selected from the group consisting of hydrogen, methyl, phenyl, lower carbalkoxy, N-alkyl- and N,N-dialkyl where alkyl has 1–4 carbon atoms - carboxamide, N-hydroxy ethylcarboxamide, carboxamide, and carboxy; B is selected from the group consisting of carboxy, lower carbalkoxy, N-alkyl and N,N-dialkyl- where alkyl has 1–4 carbon atoms-carboxamide, N-hydroxy ethyl- and N,N-dihydroxy ethyl- carboxamide, carboxamide, and nitrile, Z is selected from the group hydroxy and amino, $R_1$ and $R_2$ are selected from the group methyl and hydrogen, D stands for the radical of a diazo component containing a fiber reactive group, said fiber reactive group being a group reactive to amide and hydroxyl containing fibers, said radical of a diazo component being bound by a cyclic aromatic carbon atom to the azo group.

2. Reactive dyestuff of claim 1 of the formula

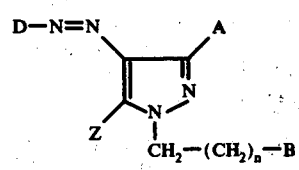

3. Reactive dyestuff of claim 1 of the formula

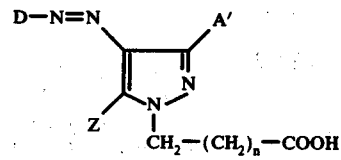

in which A' is selected from the group methyl and carboxy.

4. The reactive dyestuff of claim 1 of the formula

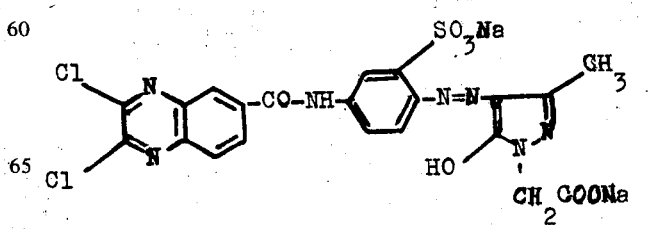

* * * * *